United States Patent
Wang et al.

(10) Patent No.: US 12,456,250 B1
(45) Date of Patent: Oct. 28, 2025

(54) SYSTEM AND METHOD FOR RECONSTRUCTING 3D SCENE DATA FROM 2D IMAGE DATA

(71) Applicant: Futureverse IP Limited, Auckland (NZ)

(72) Inventors: Yijun Wang, Auckland (NZ); Yikai Wang, Beijing (CN); Kim Chia, Petaling Jaya (MY)

(73) Assignee: Futureverse IP Limited, Auckland (NZ)

( * ) Notice: Subject to any disclaimer, the term of this patent is extended or adjusted under 35 U.S.C. 154(b) by 0 days.

(21) Appl. No.: 18/948,309

(22) Filed: Nov. 14, 2024

(51) Int. Cl.
  *G06T 15/20* (2011.01)
  *G06T 15/04* (2011.01)
  *G06T 17/20* (2006.01)
  *G06T 19/20* (2011.01)

(52) U.S. Cl.
  CPC .............. *G06T 15/20* (2013.01); *G06T 15/04* (2013.01); *G06T 17/20* (2013.01); *G06T 19/20* (2013.01); *G06T 2219/2016* (2013.01); *G06T 2219/2021* (2013.01)

(58) Field of Classification Search
  None
  See application file for complete search history.

(56) References Cited

U.S. PATENT DOCUMENTS

| | | |
|---|---|---|
| 11,080,591 B2 | 8/2021 | van den Oord et al. |
| 11,164,109 B2 | 11/2021 | Browne et al. |
| 11,429,762 B2 | 8/2022 | Mallya Kasaragod et al. |
| 11,710,027 B2 | 7/2023 | Zhu et al. |

(Continued)

FOREIGN PATENT DOCUMENTS

| | | |
|---|---|---|
| CA | 3150262 A1 | 3/2021 |
| CN | 116072098 A | 5/2023 |

(Continued)

OTHER PUBLICATIONS

Agostinelli, A. et al.: "MusicLm: Generating music from text", arXiv preprint arXiv:2301.11325, 2023.

(Continued)

*Primary Examiner* — Andrew G Yang
(74) *Attorney, Agent, or Firm* — Potomac Law Group, PLLC; Marc S. Kaufman

(57) ABSTRACT

A method and apparatus for reconstructing a three-dimensional (3D) scene from a two-dimensional (2D) input image of the scene using a fully-differentiable transformer-based encoder-decode. A 2D input image encoded into a set of image features using a pre-trained vision transformer model, wherein the vision transformer model is pre-trained with multi-view RGB image supervision and point cloud supervision. The set of image features is projected onto a 3D triplane representation using a transformer decoder to obtain output triplane tokens. A triplane representation is created from the tokens and queried. 3D point features of color and density for volumetric rendering re predicted using a multilayer perceptron. The geometry of the generated 3D asset is represented with a surface mesh including vertices and triangular faces. A texture map by is created with a multichannel image in UV space. Multiple views of the 3D scene are simultaneously generated based on the surface mesh.

13 Claims, 6 Drawing Sheets

(56) References Cited

U.S. PATENT DOCUMENTS

| | | | |
|---|---|---|---|
| 11,836,640 | B2 | 12/2023 | Ji et al. |
| 11,853,724 | B2 | 12/2023 | Hunter |
| 11,868,896 | B2 | 1/2024 | Brown et al. |
| 11,915,689 | B1 | 2/2024 | Agostinelli et al. |
| 2015/0023345 | A1 | 1/2015 | Schechner et al. |
| 2018/0190249 | A1 | 7/2018 | Roblek et al. |
| 2018/0357047 | A1 | 12/2018 | Brown et al. |
| 2020/0042879 | A1 | 2/2020 | Jansson et al. |
| 2020/0043518 | A1 | 2/2020 | Jansson et al. |
| 2020/0395037 | A1 | 12/2020 | Higuchi et al. |
| 2021/0110813 | A1 | 4/2021 | Khoury et al. |
| 2021/0125398 | A1* | 4/2021 | Bradley ............... G06T 7/70 |
| 2021/0149958 | A1 | 5/2021 | Hunter |
| 2021/0247954 | A1 | 8/2021 | Balassanian et al. |
| 2021/0279957 | A1* | 9/2021 | Eder ............... H04N 23/90 |
| 2021/0329338 | A1 | 10/2021 | Khov et al. |
| 2021/0357780 | A1 | 11/2021 | Ji et al. |
| 2022/0141599 | A1 | 5/2022 | Kohl et al. |
| 2022/0157294 | A1 | 5/2022 | Li et al. |
| 2022/0164346 | A1 | 5/2022 | Mitra et al. |
| 2022/0188810 | A1 | 6/2022 | Doney |
| 2022/0358770 | A1* | 11/2022 | Guler ............... G06V 10/82 |
| 2022/0391635 | A1* | 12/2022 | Lian ............... G06N 3/045 |
| 2022/0392428 | A1 | 12/2022 | Fernandez Guajardo et al. |
| 2023/0009454 | A1 | 1/2023 | Paciello |
| 2023/0019128 | A1 | 1/2023 | Zeghidour et al. |
| 2023/0075884 | A1 | 3/2023 | Jakobsson et al. |
| 2023/0104417 | A1 | 4/2023 | Vechtomova |
| 2023/0154090 | A1* | 5/2023 | Bradley ............... G06T 13/40 345/419 |
| 2023/0169080 | A1 | 6/2023 | Iyer et al. |
| 2023/0196567 | A1 | 6/2023 | Aykut et al. |
| 2023/0222777 | A1 | 7/2023 | Jain et al. |
| 2023/0281601 | A9 | 9/2023 | Doney |
| 2023/0282202 | A1 | 9/2023 | Ahmed et al. |
| 2023/0350936 | A1 | 11/2023 | Alayrac et al. |
| 2023/0385085 | A1 | 11/2023 | Singh |
| 2024/0096017 | A1* | 3/2024 | Gao ............... G06T 15/04 |
| 2024/0127775 | A1 | 4/2024 | Vechtomova |
| 2024/0161470 | A1* | 5/2024 | Sminchisescu ...... G06V 20/64 |
| 2024/0161761 | A1 | 5/2024 | Islam et al. |
| 2024/0394511 | A1 | 11/2024 | Thevenin et al. |
| 2024/0419949 | A1 | 12/2024 | Aykut et al. |
| 2025/0054473 | A1 | 2/2025 | Wang et al. |
| 2025/0078393 | A1* | 3/2025 | Tan ............... G06T 17/00 |

FOREIGN PATENT DOCUMENTS

| | | | | |
|---|---|---|---|---|
| CN | 116343723 | A | 6/2023 | |
| EP | 3270379 | A1 | 1/2018 | |
| EP | 4383133 | A1 | 6/2024 | |
| IN | 202211064831 | A | 5/2024 | |
| WO | 2021046541 | A1 | 3/2021 | |
| WO | 2021097259 | A1 | 5/2021 | |
| WO | 2022160054 | A1 | 8/2022 | |
| WO | WO-2024118464 | A1 * | 6/2024 | ........... G06N 3/0455 |
| WO | WO-2024129331 | A1 * | 6/2024 | |
| WO | 2024184745 | A1 | 9/2024 | |

OTHER PUBLICATIONS

Borsos Z. et al.: "AudioLm: A language modeling approach to audio generation", IEEE/ACM Transactions on Audio, Speech, and Language Processing, 2023.

Christine Payne, Musenet, 2019, URL https://openai.com/blog/musenet, 2019.

Chung, H.W. et al.: "Scaling instruction-finetuned language mod•els", arXiv preprint arXiv:2210.11416, 2022.

Copet, J. et al.: "Simple and controllable music generation", arXiv preprint arXiv:2306.05284, 2023.

Creswell, A. et al.: "Generative adversarial networks: An overview", IEEE signal processing magazine, 35(1):53-65, 2018.

Defossez, A. et al.: "High fidelity neural audio compression", arXiv preprint arXiv:2210.13438, 2022.

Dhariwal, P. et al.: "Jukebox: A generative model for music", arXiv preprint arXiv:2005.00341, 2020.

Elizalde, B. et al.: "Clap learning audio concepts from natural language supervision", In ICASSP 2023-2023 IEEE International Conference on Acoustics, Speech and Signal Processing (ICASSP), pp. 1-5. IEEE, 2023.

Zhu, Hongyuan, et al., "Pop Music Generation: From Melody to Multi-style Arrangement", ACM Transactions on Knowledge Discovery from Data (TKDD), 14(5): 1-31, 2020.

Forsgren et al., "Riffusion—Stable diffusion for real-time music generation", 2022 URL https://riffusion.com/about.

Garbacea, C. et al.: "Low bit-rate speech coding with vq-vae and a wavenet decoder", In ICASSP 2019-2019 IEEE International Conference on Acoustics, Speech and Signal Processing (ICASSP), pp. 735-739. IEEE, 2019.

Gemmeke, J.F., et al.: "Audio set: An ontology and human-labeled dataset for audio events", In 20/7 IEEE international conference on acoustics, speech and signal processing (ICASSP), pp. 776-780. IEEE, 2017.

Ghosal, D. et al.: "Text-to-audio gen•eration using instruction-tuned llm and latent diffusion model", arXiv preprint arXiv:2304.1373, 2023.

Hawthorne, C. et al.: "General• purpose, long-context autoregressive modeling with perceiver ar", In International Conference on Machine Learning, pp. 8535-8558. PMLR, 2022.

Hertz, A. et al.: "Prompt-to-prompt image editing with cross attention control", arXiv preprint arXiv:2208.01626, 2022.

Ho, J. et al.: "Classifier-free diffusion guidance", arXiv preprint, arXiv:2207.12598, 2022.

Ho, J. et al.: "Denoising diffusion probabilistic models", Advances in neural information processing systems, 33:6840-6851, 2020.

Huang, Q. et al.: "Noise2music: Text-conditioned music generation with diffusion models", arXiv preprint arXiv:2302.03917, 2023.

Huang, R. et al.: "Make-an-audio: Text-to-audio generation with prompt-enhanced diffusion models", arXiv preprint arXiv:2301.12661, 2023.

International Search Report and Written Opinion PCT/IB2024/059047 dated Jan. 14, 2025; 10 pages.

International Search Report and Written Opinion PCT/IB2025/052841 dated Apr. 24, 2025; 6 pages.

International Search Report and Written Opinion PCT/US2024/041144 dated Oct. 30, 2024; 10 pages.

Kilgour, K. et al.: "Frechet audio distance: A reference-free metric for evaluating music enhancement algorithms", In Interspeech, pp. 2350-2354, 2019.

Kong, J. et al.: "Hifi-gan: Generative adversarial networks for efficient and high fidelity speech synthesis", Advances in Neural Information Processing Systems, 33: 17022-17033, 2020.

Kong, Z. et al.: Diffwave: A versatile diffusion model for audio synthesis. arXiv preprint arXiv:2009.09761, 2020.

Kreuk, F. et al.: "Audiogen: Textually guided audio generation", arXiv preprint arXiv:2209.15352, 2022.

Liu, H. et al.: "Audioldm: Text-to-audio generation with latent diffusion models", arXiv preprint arXiv:2301.12503, 2023.

Loshchilov, I. et al.: "Decoupled weight decay regularization", arXiv preprint arXiv:1711.05101, 2017.

Marafioti, A. et al.: "A context encoder for audio inpainting", IEEE/ACM Transactions on Audio, Speech, and Language Processing, 27(12): 2362-2372, 2019.

Muhamed, A. et al.: "Symbolic music generation with transformer-gans", In Proceedings of the AAA! conference on artificial intelligence, vol. 35, pp. 408-417, 2021.

Rombach, R. et al.: "High resolution image synthesis with latent diffusion models", In Proceedings of the IEEEICVF confer•ence on computer vision and pattern recognition, pp. 10684-10695, 2022.

Rubenstein, P.K. et al.: "Audiopalm: A large language model that can speak and listen", arXiv preprint arXiv:2306.12925, 2023.

Saharia, C. et al.: "Photorealistic text-to-image diffusion models with deep language understanding", Advances in Neural Information Processing Systems, 35:36479-36494, 2022.

(56) References Cited

OTHER PUBLICATIONS

Schneider, F. et al.: "Mousai Text-to-music generation with long-context latent diffusion", arXiv preprint arXiv:2301.11757, 2023.
Steinwold: "AI + NFTs: What is an iNFT?", Apr. 6, 2021, Available at: https://andrewsteinwold.substack.com/p/ai-nfts-what-is-an-inft-.
Van Den Oord, A. et al.: "Wavenet: A generative model for raw audio", arXiv preprint arXiv:1609.03499, 2016.
Van Der Oord, A. et al.: "Neural discrete representation learning", Advances in neural information processing systems, 30, 2017.
Van Erven, T. et al.: "Renyi divergence and kullback-leibler divergence", IEEE Transactions on Information Theory, 60(7):3797-3820, 2014.
Vaswani, A. et al.: "Attention is all you need", Advances in neural information processing systems, 30, 2017.
Yang, D. et al.: "Diffsound: Discrete diffusion model for text-to-sound generation", IEEE/ACM Transactions on Audio, Speech, and Language Processing, 2023.
Yu, Y. et al.: "Conditional lstm-gan for melody generation from lyrics", ACM Transactions on Multimedia Computing, Communications, and Applications (TOMM), 17(1):1-20, 2021.
Zeghidour, N. et al.: "Soundstream: An end-to-end neural audio codec", IEEE/ACM Transactions on Audio, Speech, and Language Processing, 30:495-507, 2021.
International Search Report and Written Opinion PCT/IB2025/054129, date of mailing Jul. 1, 2025; 13 pages.
Wang et al., " DiffuseRoll: Multi-track multi-attribute music generation based on diffusion model." 1-11. Multimedia Systems. Website, https://research.ebsco.com/linkprocessor/plink?id=a9c55c7a-53b2-353e-bd6c-3d36fbd37e7f, Last accessed Jun. 16, 2025. Feb. 2024; >DOI:10.1007/s00530-023-01220-9>abstract, pp. 3-6,9.

\* cited by examiner

SYSTEM AND METHOD FOR RECONSTRUCTING 3D SCENE DATA FROM 2D IMAGE DATA

TECHNICAL FIELD

The present application generally relates to a system and method for reconstructing a three-dimensional (3D) scene from one or more two-dimensional (2D) images, and more particularly to techniques for accurately capturing and analyzing visual data to generate a realistic representation of the original scene in a 3D format.

BACKGROUND

The transition from 2D imagery to 3D geometry is a difficult task in computer vision. While human artists can meticulously craft detailed 3D assets given a single image or a concept, computational methods face hurdles in achieving comparable results. This disparity between human and machine capabilities can be attributed to the scarcity of large-scale 3D datasets and the computational complexities involved in generating detailed 3D models. Recent advances in generative model architectures have propelled certain 3D generation such as text-to-3D tasks forward, yet 3D generation from single view image remains a formidable challenge. Existing methods including template-based pipelines, 2D-lifting approaches and 3D generative models grapple with generalization and quality issues. The aforementioned methods often producing content limited to simplistic objects or constrained by dataset size. The process is also computationally complex, labor-intensive and expertise-dependent as they demand extensive training times and lack robustness to replicate intricate, artistically diverse structures seen in real-world 3D assets. Ideally, an effective image-to-3D object generation model should swiftly produce high-fidelity 3D objects, leverage 2D images for guidance, and produce detailed 3D objects with diverse geometry and textures even in unseen angles. Such a model would democratize 3D content creation, enabling broader engagement with the realm of 3D modeling that aligns with the demands of modern industries like gaming, robotics, and architecture.

There are a few main paradigms in the image-to-3D literature. The first paradigm aims to directly learn the posterior distribution of 3D models given a prompt by utilizing large repositories of CAD models such as CO3D, Google Scanned Objects, Objaverse, Shapenet paired with text descriptions. Approaches within this paradigm include LAS diffusion. Although large-scale 3D datasets such as ObjaverseXL are becoming more available, the scale is hardly a match to the 2D counterparts, such as the Internet-scale image data LAION-5B. Because of this relative scarcity of 3D data, models built in this paradigm often have limited generalization capabilities. Moreover, due to 3D datasets being mostly synthetic, domain gap with real data is difficult to eliminate.

The second paradigm leverages on text-to-image diffusion models, such as Stable Diffusion (SD) and Stable Video Diffusion (SVD), trained on extremely large datasets such as LAION-5B and LVD. The key idea is to build a 3D representation by exploiting the multi-view information stored in a pre-trained text-to-image model. Hence, SD and SVD are commonly used as foundation models for 2D-lifting as a 2D prior or Novel View Synthesis (NVS). Such models provide direct feedback to the neural renderings of views of a 3D representation through the Score Distillation Sampling (SDS) technique that is adopted in many works. 2D lifting method yields more appealing results as it provides more realistic-looking, diverse and highly detailed 3D content than method in the first paradigm. However, challenges arise due to the lack of comprehensive multi-view knowledge or 3D-awareness during score distillation. These challenges encompass: (1) the multi-face or Janus issue; and (2) content drift across different views. For instance, certain objects may become invisible, blurred or dark from some angles due to images are often hidden or occluded from specific viewpoints. his method also requires per-shape optimization, which is not ideal in generating assets in real time.

The third paradigm uses a large reconstruction model (LRM) approach. Based on a highly scalable transformer architecture, LRMs point out a promising direction for the fast creation of high-quality 3D assets. Concurrently, Instant3D proposes a diagram that predicts 3D shapes via an enhanced LRM with multi-view input generated by diffusion models. The method combines LRMs with image generation models, which significantly improves the generalization ability. Existing LRMs use triplane NeRFs as the 3D representation for high rendering quality. While these NeRFs can be converted into meshes via a Marching Cube (MC) post-processing, this leads to a significant drop in rendering quality and geometric accuracy.

Generative probabilistic models include variational auto-encoders (VAE), generative adversarial networks (GAN), normalizing flows, autoregressive models (AR), diffusion models, transformer models. Latent diffusion that has been found useful in, e.g., images 104 and videos, where the diffusion process happens over the latent space of a simpler generative model (e.g. a VAE). Latent diffusion models allow for easy decoding of multiple attributes through different decoders. Our sparse-view reconstructor adopts a highly scalable transformer-based architecture and is trained on large-scale 3D data. This gives it the ability to accurately reconstruct 3D models of unseen objects from a sparse set of 4 images without per-shape optimization.

Many 3D generative modeling techniques focus on object-level shape synthesis. Early learning-based methods explore point clouds, and meshes, as well as various approaches that learn implicit representations such as Signed Distance Fields (SDFs), occupancy networks, and Neural Radiance Fields (NeRFs).

Leveraging 3D templates, semantics and poses as shape priors have also been widely studied in category-specific reconstruction. Known category-agnostic methods show great generalization potential, but they often unable to produce fine-grained details even when exploiting spatially-aligned local image features. Some methodologies distill 2D image priors into 3D via inverse rendering, while others focus on directly learning 3D priors from large-scale 3D datasets. Hybrid 2D-3D approaches which better leverage both image priors and 3D priors can instill multi-view consistency without the need for expensive test-time optimization.

There is an emerging trend of using pre-trained image/language models to introduce semantics and multi-view guidance for image-to-3D reconstruction. For instance, Zero-1-to-3 is a framework designed for zero-shot 3D object reconstruction from a single image. Developed by researchers at Columbia University and Toyota Research Institute, it leverages large-scale diffusion models to generate new views of an object from just one RGB image12.

This method is particularly notable for its ability to perform novel view synthesis and 3D reconstruction without needing multiple images or extensive training data2. It uses geometric priors learned from natural images to create accurate 3D representations, making it a significant advancement in the field of computer vision3. Zero 1 to 3 fine-tunes the Stable Diffusion model to generate novel views by conditioning on the input image and camera poses. View consistency and reconstruction efficiency have been further improved by Liu et al. Make-It-3D uses BLIP to generate text descriptions for the input image applied to guide the text-to-image diffusion and trains the model with score distillation sampling loss (SDS) and CLIP image loss to create geometrically and semantically plausible shapes.

Early attempts on image-to-3D mainly focus on the single-view reconstruction tasks. With the rise of diffusion models, pioneer works have investigated image-conditioned 3D generative modeling on various representations, e.g., point clouds meshes, SDF grids, and neural fields. Despite the promising progress these methods have made, they are hard to generalize to open-world objects due to the limited scale of available training data. The advent of powerful text-to-image diffusion models inspires the idea of distilling 2D diffusion priors into 3D neural radiance fields with a per-shape optimization strategy. The score distillation sampling (SDS) proposed by DreamFusion exhibits superior performance on zeroshot text-to-3D synthesis and outperforms CLIP-guided alternatives significantly. However, SDS-based methods frequently encounter the multi-face issue, also known as the "Janus" problem. [

Zero123 demonstrates that Stable Diffusion can be fine-tuned to synthesize novel views by conditioning on relative camera poses. Leveraging the novel view guidance provided by Zero123, recent image-to-3D methods show improved 3D consistency and can generate plausible shapes from open-domain images. Instant3D [19] leverages an LRM to reconstruct a triplane NeRF from four sparse generated images.

To address the inconsistency among multiple generated views of Zero123, some techniques try to fine-tune 2D diffusion models to synthesize multiple views for the same object simultaneously. With 3D consistent multi-view images, various techniques can be applied to obtain the 3D object, e.g., SDS optimization, neural surface reconstruction methods, and multi-view-conditioned 3D diffusion models. To further enhance the generalization capability and multi-view consistency, some recent works exploit the temporal priors in video diffusion models for multi-view generation.

Many popular 3D representations exist in the 3D generation literature. Point clouds are flexible and adaptive, but cannot represent solid surfaces well, o and require additional surface reconstruction steps. Voxel grids can be expressive for various 3D structures, and can be fast to query and process as voxel information is not stored in empty regions for sparse voxel representations. However, voxels can only represent geometry without RGB information, have a limited effective resolution of 2563, do not consider hierarchical generation, and are not robust to large-scale and diverse 3D generation. Triangle meshes are more expressive but are limited to a fixed topology and hence hard to optimize. Neural fields encode scene geometry implicitly in the network weights and lack an explicit inductive bias for effective distribution modeling. Triplanes can represent objects at high resolutions with reduced memory footprint, but fundamentally lack a geometric bias except for large axis-aligned planes, posing challenges when modeling larger scenes with complex geometry.

Recently, some methods based on neural implicit surfaces have emerged to reconstruct shapes using continuous neural implicit function from multi-view images. Two key techniques involve surface rendering and volume rendering. Surface rendering need to compute the precise location of the surface to render images and gradient descent is applied only on the surface. Volume rendering performs NeRF-style ray marching algorithm. For each pixel, the camera shoots a ray crossing it with points bring sampled along the ray. Each sampled point carries a view-dependent RGB color (or radiance) and density (or opacity), predicted by a multilayer perceptron (MLP). The final pixel color is the accumulated radiance of all the sampled points with respect to their density, similar to alpha-compositing, where the surface of the shape can be extracted later via iso-surfacing.

The disclosed implementations build on many related technologies which are discussed below.

Generative Probabilistic Models: Common generative models include variational autoencoders (VAE), generative adversarial networks (GAN), normalizing flows, autoregressive models (AR), diffusion models, transformer models. Latent diffusion that has been found useful in, e.g., images and videos, where the diffusion process happens over the latent space of a simpler generative model (e.g. a VAE). Latent diffusion models allow for easy decoding of multiple attributes through different decoders. Our sparse-view reconstructor adopts a highly scalable transformer-based architecture and is trained on large-scale 3D data. This gives it the ability to accurately reconstruct 3D models of 108 novel unseen objects from a sparse set of 4 images without per-shape optimization.

3D Generative Models: Many 3D generative modeling focuses on object-level shape synthesis. Early learning-based methods explore point clouds, and meshes, as well as various approaches that learn implicit representations such as SDFs, occupancy networks, and NeRF. Leveraging 3D templates, semantics and poses as shape priors have also been widely studied in category-specific reconstruction. Category-agnostic methods show great generalization potential, but they often are unable to produce fine-grained details even when exploiting spatially-aligned local image features. some methods distill 2D image priors into 3D via inverse rendering, while others directly learn 3D priors from large-scale 3D datasets. Hybrid 2D-3D approaches can better leverage both image priors and 3D priors that can instill multi-view consistency without the need for expensive test-time optimization.

There is an emerging trend of using pre-trained image/language models to introduce semantics and multi-view guidance for image-to-3D reconstruction. For instance, Zero-1-to-3 fine-tunes the Stable Diffusion model to generate novel views by conditioning on the input image and camera poses. Make-It-3D uses BLIP to generate text descriptions for the input image applied to guide the text-to-image diffusion and trains the model with score distillation sampling loss (SDS) and CLIP image loss to create geometrically and semantically plausible shapes.

Early attempts on image-to-3D mainly focus on the single-view reconstruction task. With the rise of diffusion models, pioneer works have investigated image-conditioned 3D generative modeling on various representations, e.g., point clouds, SDF grids and neural fields. Despite the promising progress these methods have made, they are hard to generalize to open-world objects due to the limited scale of training data. The score distillation sampling (SDS) proposed by DreamFusion exhibits superior performance on zeroshot text-to-3D synthesis and outperforms CLIP-guided alternatives [35, 17, 54] significantly. However, SDS-based methods frequently encounter the multi-face issue, also known as the "Janus" problem, which refers to a specific issue in the field of 3D object generation and view consistency. It occurs when the most canonical view of an object, such as the front view of a face, appears in other views where it shouldn't. This can lead to inconsistencies and unrealistic representations in generated 3D models.

Zero 1 to 3 demonstrates that Stable Diffusion can be fine-tuned to synthesize novel views by conditioning on relative camera poses. Leveraging the novel view guidance provided by Zero1 to 3, recent image-to-3D methods show improved 3D consistency and can generate 140 plausible shapes from open-domain images. Instant 3D leverages an LRM to reconstruct a 141 triplane NeRF from four sparse generated images.

3D-Aware/Novel View Image Synthesis: To address the inconsistency among multiple generated views of Zero123, some methods try to fine-tune 2D diffusion models to synthesize multiple views for the same object simultaneously. With 3D consistent multi-view images, various techniques can be applied to obtain the 3D object, e.g., SDS optimization, neural surface reconstruction methods, and multi-view-conditioned 3D diffusion models. To further enhance the generalization capability and multi-view consistency, some recent methods exploit the temporal priors in video diffusion models for multi-view generation.

3D Representation for Generative Tasks: Many popular 3D representations exist in the 3D generation literature. Point clouds are flexible and adaptive, but cannot represent solid surfaces well, often have missing point clouds issues, and require additional surface reconstruction steps. Voxel grids can be expressive for various 3D structures, can be fast to query and process as voxel information is not stored in empty regions for sparse voxel representations. However, voxels can only represent on geometry without RGB information, have a limited effective resolution of 2563, do not consider hierarchical generation, and are not robust to large-scale and diverse 3D generation.

Triangle meshes are more expressive but are limited to a fixed topology and hence hard to optimize. Neural fields encode scene geometry implicitly in the network weights and lack an explicit inductive bias for effective distribution modeling. Triplanes can represent objects at high resolutions with reduced 159 memory footprint, but fundamentally lack a geometric bias except for large axis-aligned planes, 160 posing challenges when modeling larger scenes with complex geometry.

Neural surface reconstruction: Recently, some methods based on neural implicit surfaces have emerged to reconstruct shapes using 163 continuous neural implicit function from multi-view images. Two key techniques involve surface rendering and volume rendering. Surface rendering need to compute the precise location of the surface to render images and gradient descent is applied only on the surface. Volume rendering performs NeRF-style ray marching algorithm. For each pixel, the camera shoots a ray crossing it with points bring sampled along the ray. Each sampled point carries a view-dependent RGB color (or radiance) and density (or opacity), predicted by a multilayer perceptron (MLP). The final pixel color is the accumulated radiance of all the sampled points with respect to their density, similar to alpha-compositing, where the surface of the shape can be extracted later via iso-surfacing.

Differentiable volumetric rendering (DVR) and implicit differentiable renderer (IDR) adopt surface rendering to model the occupancy functions or signed distance functions for 3D shapes, respectively. Volume rendering methods such as UNISURF, VoISDF, HF-NeuS and NeuS incorporate occupancy functions or the signed distance functions into the volume rendering equation. The reconstructed surface maintains smoothness as the implicit function can be regularized by the Eikonal loss.

SUMMARY

Disclosed implementations address the problem of reconstructing a three-dimensional scene from a two-dimensional input image using a fully-differentiable transformer-based encoder-decoder framework. A first disclosed implementation is a method for reconstructing a three-dimensional (3D) scene from a 2D input image of the scene using a fully-differentiable transformer-based encoder-decoder framework, the method comprising: encoding the 2D input image into a set of image features using a pre-trained vision transformer model, wherein the vision transformer model is pre-trained with multi-view RGB image supervision and point cloud supervision; projecting the set of image features onto a 3D triplane representation using a transformer decoder to obtain output triplane tokens; upsampling and reshaping the output triplane tokens into a triplane representation; querying the triplane representation to obtain D point features; predicting, using a multi-layer perceptron, 3D point features of color and density for volumetric rendering; representing the geometry of the generated D asset with a surface mesh including vertices, triangular faces; representing a texture map by with a multichannel image in UV space; and synthesizing multiple views of the 3D scene by generating multi-view images simultaneously based on the surface mesh.

The utilization of a pre-trained vision transformer model, which has been trained with multi-view RGB image supervision and point cloud supervision, enhances the accuracy and robustness of the feature extraction process, leading to a more precise 3D scene reconstruction from a single 2D image. The ability to synthesize multiple views of the 3D scene by generating multi-view images simultaneously based on the surface mesh allows for the creation of comprehensive and detailed visualizations of the reconstructed scene, which can be beneficial for applications such as virtual reality and 3D modeling.

By representing the geometry with a surface mesh and the texture with a multichannel image in UV space, a high level of detail and realism can be achieved in the reconstructed 3D scene, which can improve, for example, a user experience in visualization and interaction within digital environments. A three-dimensional scene can be constructed from a 2D input image using a fully-differentiable transformer-based encoder-decoder framework, which allows for accurate and detailed scene reconstruction.

By projecting the image features onto a 3D triplane representation using a transformer decoder with self-attention, the method benefits from modeling relations among spatially structured triplane tokens, resulting in more accurate and realistic scene reconstruction. A neural signed distance function (SDF) and a texture field via latent codes can be applied offering the advantage of encoding both the shape and texture of the 3D scene, allowing for more detailed and visually appealing rendering.

A differentiable marching cube algorithm can be used to extract the 3D surface mesh from the neural SDF, providing a continuous representation for the geometry of the 3D scene. Traditional Marching Cube algorithms are used to extract a polygonal mesh of an isosurface from a three-dimensional scalar field (like a 3D image) by iterating over a grid of cubes, determining the intersection of the isosurface with each cube, and generating triangles to represent the surface. Differentiable Marching Cube algorithms, unlike the traditional version, allow for gradient-based optimization. This means it can be integrated into neural networks and other machine learning models, enabling end-to-end training.

The transformer decoder projects the 2D image features onto the 3D triplane representation by modeling relations among spatially structured triplane tokens via self-attention. The transformer decoder's use of self-attention to model relations among spatially structured triplane tokens enables the method to capture complex spatial relationships within the data, resulting in a more accurate and coherent 3D triplane representation. The self-attention mechanism within the transformer decoder facilitates the processing of image features without the constraints of a fixed grid structure, allowing for more flexible and scalable 3D scene reconstruction.

The method further may further comprise generating, by a triplane-transformer, a neural signed distance function (SDF) and a texture field via two latent codes to encode the shape and texture of the 3D scene. Generating a neural signed distance function (SDF) and a texture field via two latent codes allows for a compact and efficient encoding of the shape and texture of the 3D scene, which can reduce computational overhead and improve processing speed. The triplane-transformer's ability to encode shape and texture separately provides the flexibility to independently modify these attributes, thereby enhancing the versatility of the method for various applications such as 3D design and animation.

The neural SDF can provide a continuous representation for the geometry of the 3D scene to therebe enables the creation of smooth and high-resolution surface meshes, improving the visual quality of the reconstructed scene. A continuous geometric representation through the neural SDF allows for the accurate capture of intricate details and complex topologies in the 3D scene, which is beneficial for precision-dependent applications such as scientific visualization and digital heritage preservation.

The method may further comprise a transformer decoder being conditioned on camera and wherein the triplane image tokens include pose-aware image tokens. The inclusion of a transformer decoder conditioned on camera inputs enhances the contextual relevance of the generated images, leading to more accurate and realistic renderings that are consistent with the camera's perspective. By utilizing pose-aware image tokens, the method ensures that the synthesized images maintain correct alignment with the spatial orientation and position of objects within the scene, thereby improving the visual coherence of the rendered environment.

The conditioning of on camera parameters allows for the generation of images that are tailored to specific camera settings, making the method highly adaptable to various camera configurations and use cases. The camera features can be constructed by flattening out a camera extrinsic matrix and concatenating it with camera focal length and optical center. Constructing camera features by flattening the camera extrinsic matrix and concatenating it with the camera focal length and optical center provides a compact and efficient representation of the camera's geometric properties, which can be easily processed by neural networks.

As an example, the transformer decoder is conditioned on camera features by combining the camera's extrinsic (position and orientation in the world), intrinsics (focal length and optical center) into a set of camera features that are then normalized to ensure consistency and reduce variability in the input to the transformer decoder. A modulation function is applied (for example, an adaptive layer normalization (LN) that adjusts the image latents based on the denoising timesteps and the camera features).

This method of camera feature construction facilitates the accurate incorporation of camera-specific attributes into the rendering process, ensuring that the resulting images are correctly projected and aligned according to the actual camera setup. The streamlined representation of camera features simplifies the integration with other components of the rendering pipeline, enhancing the overall computational efficiency and reducing the complexity of the rendering algorithm.

BRIEF DESCRIPTION OF DRAWINGS

The present disclosure is illustrated by way of example and not limited in the accompanying figures in which like reference numerals indicate similar elements.

Implementations of the application will now be described with reference to the attached drawings.

DETAILED DESCRIPTION

Figure 1:
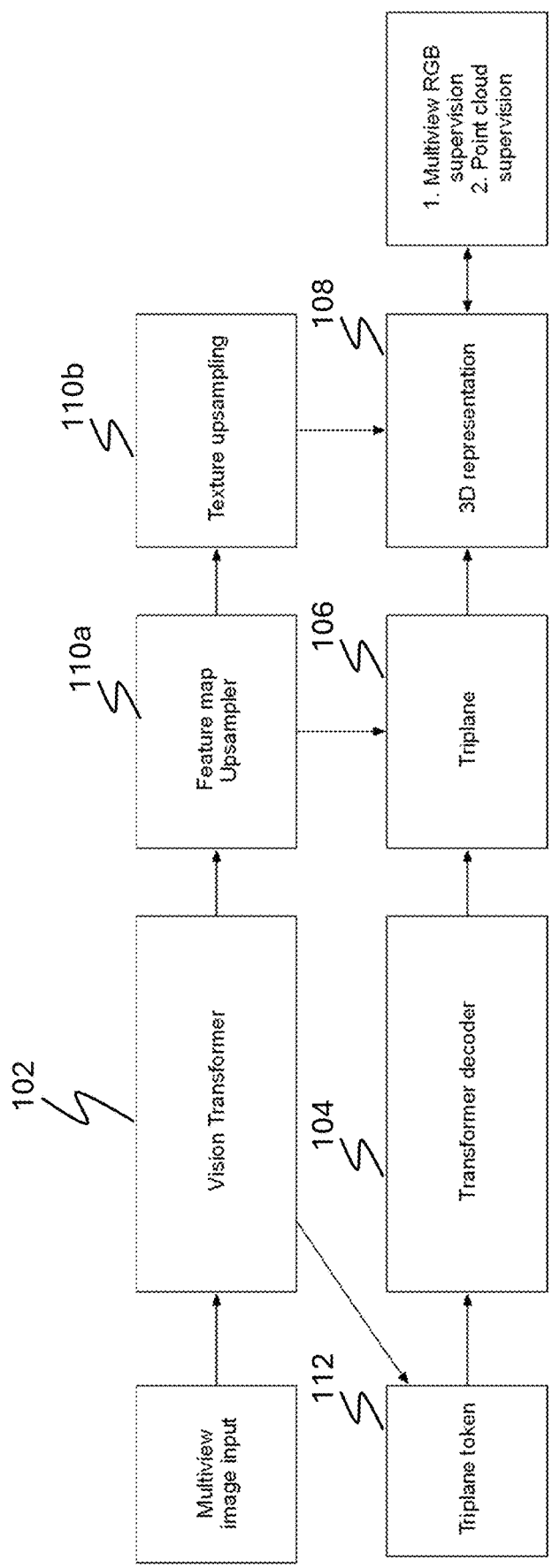
FIG. 1 is an architecture diagram in accordance with disclosed implementations.

Applicants have discovered that the challenges and shortcomings of existing 2d image-to-3D generation methods can be due to several factors:

Inconsistent novel views for multi-view generation: Multi-view consistency is the most critical requirement for high-quality NVS and 3D generation. Since conventional 2d model only see a single view at each iteration and attempt to make every view look like the input, they often generate 3D inconsistent shapes that may result in the "Janus problem", a problem in image generation faced by diffusion models when creating 3D content from text prompts in which the models struggle to accurately capture the intended meaning of the text, especially regarding view information.

Poor generalization: There is a deficiency in large-scale and diversified 3D datasets that impedes large-scale learning of 3D geometry.

Slow inferencing: Often, trade-off exists between the level of detail and computational resources. Per-shape optimization can be very detailed but typically involves tens of thousands of iterations of full-image volume rendering and prior model inferences, resulting the use of an extreme amount of computing resources/slow operation.

Memory resources: Since a full image is required for conventional 2D models, the volume rendering can be memory-intensive when the image resolution is high.

Non physically based Texturing: Burn marks and or shadows can occur in texture due to the use of pre-trained diffusion models that is not trained on D-aware datasets (i.e., datasets images that explicitly control the 3D camera position).

3D geometry with rough shapes and holes: Many conventional methods utilize the density field as the representation in volume rendering. This often produces good RGB renderings but makes it difficult to extract high-quality mesh.

Neural Radiance Field (NeRF), a known deep learning technique for generating 3D images, represents a 3D scene radiance field by a Multi-Layer Perceptron (MLP), where given an input 3D location $x \in R^3$ and the view direction d. The output is the volume density $\sigma_x$, and view-dependent color $clr_x$:

$$\sigma_x clr_x = F(x,d). \quad (1)$$

Then the density $\sigma$ and color clr are used in the differentiable volume rendering:

$$\hat{C}(r) = \sum_{i=1}^{N} T_i(1-\exp(\sigma_i \delta_i))clr_i \quad (2)$$

where $\hat{C}(r)$ is the volume rendering predicted RGB colors for ray r, T is the volume transmittance $_{138}$ and $\delta$ is the ray marching step size.

The whole rendering process is differentiable, which allows the $_{184}$ neural network to be optimized by rendering loss:

$$L_{r \in R} = \sum^X \|\hat{C}(r)C(r)\|_2^2 \quad (3)$$

where C(r) is the ground truth RGB colors.

The MLP predicts the color and density of 3D point features for volumetric rendering by applying the following steps. The MLP receives the upsampled and reshaped triplane tokens, which contain encoded spatial information about the 3D scene, are used as input to the MLP and the MLP processes the input features sequentially. Each layer of the MLP performs a series of linear transformations and non-linear activations to learn complex mappings from the input features to the output color and density values. For each 3D point, the MLP outputs RGB color values. These values represent the color that each point in the 3D space should have when rendered. Along with color, the MLP also predicts the density (or opacity) of each 3D point. This density value is crucial for volumetric rendering, as it determines how much each point contributes to the final rendered image. The predicted color and density values are used in a differentiable rendering process, which simulates the way light interacts with the 3D scene. This process is differentiable, allowing gradients to be backpropagated through the MLP to improve predictions during training. The MLP is then trained to minimize a loss function that compares the rendered images to ground truth images. This optimization ensures that the predicted color and density values result in realistic and accurate renderings.

In disclosed implementations, a learning-based model is trained on 2D images and can directly synthesize high-quality textured 3D meshes in short, e.g., 20 seconds, inference times on a graphics processing unit (GPU). The framework combines a multi-view image-to-image diffusion model to perform NVS, an image encoder that projects red, green and blue (RGB) images into latent vectors, a transformer-based decoder that learns a triplane representation from latent vectors, and a volumetric renderer that predicts the RGB and density of a 3D point in space and differentiable iso-surfacing. Given a sampled noise vector from a Gaussian distribution, the 3D generator predicts a signed distance field. Then, a mesh is extracted (via differentiable marching cubes, for example), and a differentiable renderer renders one RGB image and one 2D silhouette, which are fed into 2D discriminators to classify whether they are real or fake. The differentiable iso-surfacing module enables the ability to directly generate meshes, and also largely 89 affects the quality of the produced meshes.

The overall architecture of the disclosed implementations includes a fully-differentiable transformer-based encoder-decoder framework with triplane representation for single-image to NeRF reconstruction. As illustrated in FIG. 1, disclosed implementations can apply pre-trained vision transformer model 102 to encode the input image, where the image features are projected to a 3D triplane representation 106 by large transformer decoder 104 via cross-attention. The output triplane tokens are upsampled (at 110a) and reshaped (at 110b) into final triplane 3D representation (also referred to as "3D representation" herein) 108, which is used to query 3D point features. A Triplane representation is a novel approach used in single-view 3D reconstruction. It combines both explicit and implicit representations to achieve high-quality results.

Figure 2:
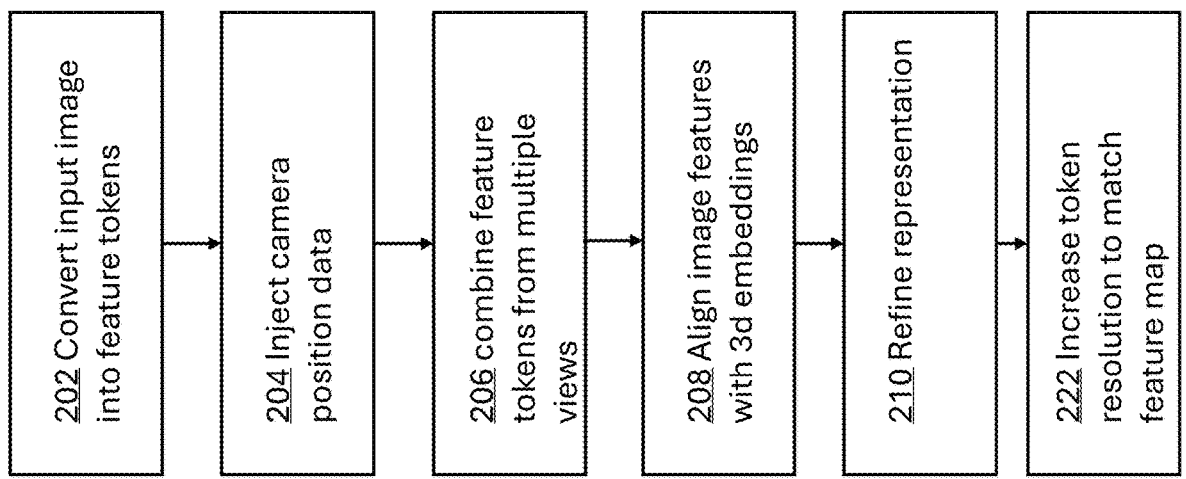
FIG. 2 is a flow chart illustrating the steps accomplished by transformer decoder to project the set of image features onto a 3D representation in accordance with disclosed implementations.

The pre-trained vision transformer is used for encoding a single image into feature tokens 112. One example of a pre-trained model that could potentially be used for such a purpose is Stable Diffusion, as it is a text-to-image diffusion model that has been trained on large datasets like LAION-5B. However, the vision transformer of the disclosed implementations is used for encoding images into latent vectors. The vision transformer serves as an image encoder that projects the RGB images into latent vectors, which are then used by a transformer-based decoder to learn a triplane representation for 3D generation FIG. 2 illustrates the steps accomplished by transformer decoder 104 to project the set of image features onto a 3D representation 108. At step 202, the input image is converted into feature tokens 112. At step 204, camera positioning data is injected to make tokens aware of the image's viewpoint. At step 206, feature tokens are combined from multiple views into a comprehensive feature set. At step 208, image features are aligned with initial 3D triplane embeddings using the cross-attention mechanism in the transformer. At Step 210, the triplane representation is refined by considering the internal relationships between the tokens. At step 212, the resolution of the triplane tokens is increased to match the desired 3D feature map resolution.

3D representation 108 stores three planes with a resolution of N×N×C, where C is not necessarily 1. These planes capture essential scene information, allowing efficient 3D reconstruction1. This enables rapid 3D reconstruction from single-view images within seconds. The disclosed implementations leverage both explicit (surface details) and implicit (volumetric) representations for better results. To query a 3D representation, the Triplane Meets Gaussian Splatting (TGS) framework can be used. Then, a multi-layer perceptron is used to predict the 3D point features' color RGB and density for volumetric rendering. The entire network can be trained with multi-view RGB image supervision and point cloud supervision. The generated 3D asset's geometry can be represented with a surfaced mesh, denoted as M=(V,F,T) with $_{196}$ vertices V={$v_i$},$v_i \in R^3$ and triangular faces F=$f_i$ where each f is a triplet of vertices, while $_{197}$ the texture map is represented by a multi-channel image in UV space, denoted as T$\in R^{H \times W \times C}$.

Figure 3:
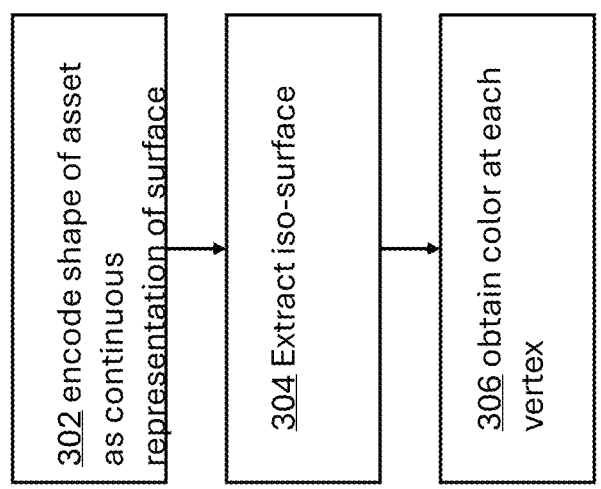
FIG. 3 is a flow chart illustrating the steps for creating a surfaced mesh in accordance with disclosed implementations.

The surfaced mesh is represented and created through the following process illustrated in FIG. 3. A neural signed distance function (SDF) is used to encode the shape of the 3D asset as a continuous representation of its surface, at step 302. Then, at step 304, the iso-surface corresponding to the neural SDF is extracted using a differentiable version of the Marching Cubes algorithm, which allows for end-to-end training of the network. At step 306, the color at each vertex of the mesh is obtained by querying the neural texture field, which provides a color value for each point on the surface.

The neural SDF is a function that encodes the shape of a 3D object as a continuous value representing the signed distance from a point in space to the nearest point on the object's surface. A positive value indicates the point is outside the surface, a negative value indicates it is inside, and zero represents a point on the surface. Two latent codes can be used to generate the 3D neural SDF and a texture field. These latent codes are vectors of parameters that are learned during the training process and are used to shape the final 3D representation.

One of these latent codes is mapped to SDF values at each vertex of the mesh through a series of conditional 3D convolutional and fully connected layers. The 3D convolutional layers generate a feature volume conditioned on the latent code, and the feature at each vertex is queried using trilinear interpolation. The texture field is generated by rendering the surface of the 3D shape. The color obtained from each surface vertex is optimized by surface rendering, which projects the texture onto the mesh's surface using UV mapping. This process creates a coarse texture image that can be further refined.

Generating multi-view images simultaneously is another strategy to bring 3D-awareness to 2D diffusion models. Disclosed implementations concatenate information from other views with the current view as keys and queries in the self-attention layers. The gathered information can be from the single projection, epipolar lines or all the pixels. Further the model of disclosed implementations is fine-tuned on multi-view renderings from 3D datasets, such as Objaverse. To construct 3D models, conventional techniques either use Synthetic Data Sets (SDS), which is still time-consuming, or image-based reconstruction systems like NeuS, which requires at least 10 views to produce reasonable reconstructions. The disclosed implementations may generate multi-view 2.5D maps to avoid SDS reconstruction while maintaining small view numbers.

A standard vision transformer (ViT) mode can be deployed with self-supervised training through self-distillation with no labels the Deeper into Neural Networks (DINO) method. The ViT encoder model that is similar to BERT, can be pre-trained on a large collection of images in a self-supervised fashion, namely ImageNet-1$k$, at a resolution of 224×224 pixels. DINO ViT learns an inner representation of images that can act as high-performance features to be directly used as inputs useful for downstream task. Due to their ability to adapt to varying inputs, the attention-based ViT can deal with unseen objects and are naturally suited to transferring pre-trained weights to a variety of tasks. Self-supervised DINO ViT can automatically segment the background pixels of an image, even though never trained using pixel-level supervision, a phenomena otherwise not observed in CNNs or fully supervised ViTs.

A pre-trained DINO ViT can be used to encode the input RGB image into patch-wise feature tokens tokens $\{h_{i=1}^n\} \in \mathbb{R}^{d_E}$, where i denotes the i-th image patch, n is the total number of patches, and $d_E$ is the latent dimension of the encoder. As a result, instead of only using the ViT pre-defined class token that aggregates patch-wise features, we also utilize the entire image feature sequence $\{h_{i=1}^n\}$ to better preserve the detailed structural and texture information of an image.

To support multi-view inputs, as noted above, camera information can be injected in the image encoder to make the output image tokens pose-aware. The final output of the image encoder is a set of pose-aware image tokens. The tokens can be concatenated together as the feature descriptors (tokens) for the multi-view images as $f_I = \oplus (f_{I_1}^*, \ldots, f_{I_4}^*)$.

An image-to-triplane transformer decoder can be used to project the 2D image features generated by the pre-trained visual transformer DINO onto the 3D triplane via cross-attention and model the relations among the spatially-structured triplane tokens via self-attention. This method takes an image as input and regresses a NeRF in the form of a triplane representation. To obtain the triplane representation T, where T contains three axis-aligned feature planes $T_{XY}$, $T_{YZ}$ and $T_{XZ}$, learnable spatial-positional embeddings $f^{init}$ of dimension (3×32×32) $d_D$ is defined, where $d_D$ is the hidden dimension of the transformer decoder. Each feature plane has a dimension of (64×64)$d_T$ where (64×64) is the spatial resolution, and $d_T$ is the number of feature channels.

The feature planes guide the image-to-3D projection and are used to query the image features via cross-attention. As the number of tokens in $f_{init}$ smaller than the number of final triplane tokens (3×64×64), the output of the transformer $f_{out}$ will be upsampled to the final T. In the forward pass, conditioning on the camera features c and image features $\{h_{n=1}^n\}$, each layer of our image-to-triplane transformer $_{240}$ decoder gradually updates the initial positional embedding $f^{init}$ to the final triplane features via modulation and cross-attention, respectively. The reason for applying two different conditional operations is that the camera controls the orientation and distortion of the whole shape, whereas the image features carry the fine-grained geometric and color information that need to be embedded onto the triplane. Each transformer layer contains a cross-attention sub-layer, a self-attention sub-layer, and a multi-layer perceptron (MLP) sub-layer, where the input tokens to each sub-layer are modulated $_{246}$ by the camera features of the input image $c \in R^{20}$.

Camera features can be constructed by flattening out a 4-by-4 camera extrinsic matrix E that represents the camera-to-world transformation concatenated with the camera focal length foc and optical center, also known as the principal point pp, given by $c=[E_{1 \times 16}, foc_x, foc_y, pp_x, pp_y]$. E is then normalized by similarity transformations so that all the input cameras are aligned on the same axis with the lookup direction aligned with the z-axis. Conditioning on normalized camera parameters greatly reduces the optimization space of triplane features and facilitates model convergence. MLP is used to embed the camera feature by mapping the camera feature to a high-dimensional camera embedding $\tilde{c}$. The 3-by-3 camera intrinsic matrices K that represent foc, pp and the skew coefficient sk are normalized by the image's height and width before sending to the MLP layer. This camera modulation is similar to DiT where an adaptive layer norm is used for modulating image latents with denoising timesteps and class labels. Given $\{f_j\}$ is a sequence of vectors in transformer, the modulation function Mod $LN_c(f_j)$ can be defined as:

$$\gamma, \beta = MLP_{mod}(c^-) \quad (4)$$

$$Mod\ LN_c(f_j) = LN(f_j) \cdot (1+\gamma) + \beta \quad (5)$$

where c is the camera feature, y is the scale and $\beta$ is the shift output by $MLP_{mod}$ while LN is the $_{200}$ Layer Normalization.

This modulation is applied to each attention sub-layer. The triplane-transformer generates a 3D neural SDF and a texture field via two latent codes. The learned neural SDF encodes the shape as the signed distance function to its surface, providing a continuous, compact and differentiable representation for the geometry. We map $w_1 \in R^{511}$ to SDF values and deformations at each vertex $v_i$ through a series of conditional 3D convolutional and fully connected layers. Specifically, first the 3D convolutional layers are used to generate a feature volume conditioned on $w_1$. The feature at each vertex $v_i \in V_T$ is then queried using trilinear interpolation and fed into MLPs that output the SDF value $s_i$ and the deformation i.

Output tokens 106 from the triplane-transformer decoder are reshaped and upsampled to the final triplane feature maps, as discussed above. Differentiable marching cube can be utilized to extract a 3D surface mesh from the neural SDF, while the texture field is queried at surface points to get colors after obtaining $s_i$ and $_i$ for all the vertices. The model, can use the method from FeatUp whereby there are two variants of feature map upsampling—one that guides features with high-resolution signal in a single forward pass, and one that fits an implicit model to a single image to reconstruct features at any resolution. The upsampling method compute high-resolution features by observing multiple different views of low-resolution features, similarly to a NeRF when building a representation. Both approaches use a multi-view consistency loss with deep analogies to NeRFs.

Figure 4:
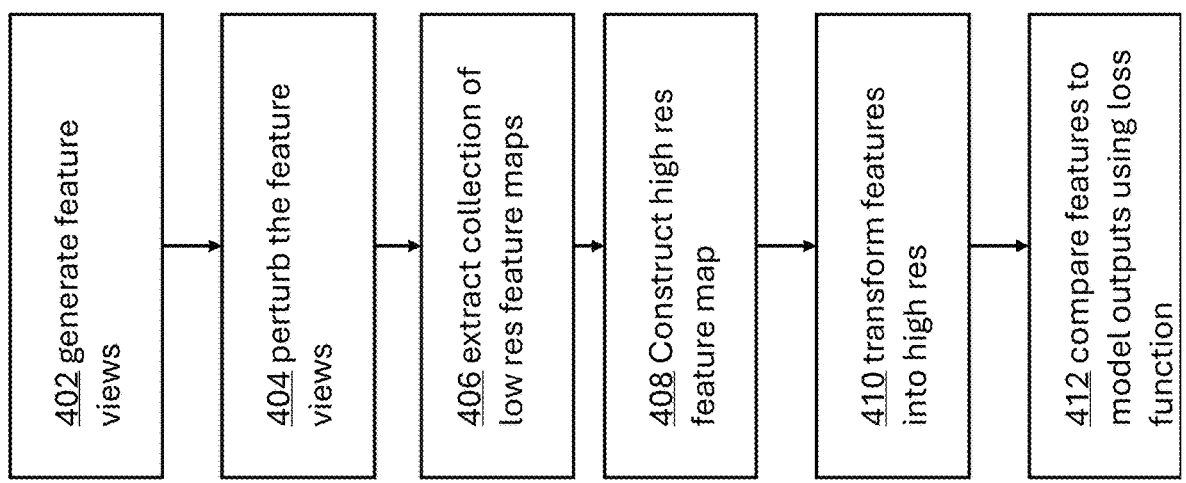
FIG. 4 is a flow chart illustrating the steps feature map upsampling in accordance with disclosed implementations.

FIG. 4 illustrates the process of feature map upsampling. At step 402 low-resolution feature views are generated to refine into a single high-resolution output. At step 404, the feature views are perturbed with small pads, scales, and horizontal flips. At step 406, the model is applied to each transformed feature to extract a collection of low-resolution feature maps. This allows observation of tiny differences in the output features and provides sub-feature information to train the upsampler, implemented with a stack of parameterized joint bilateral upsamplers (JBU).

At step 408, a consistent high-resolution feature map is constructed from these views. A latent high-resolution feature map can be learned that, when downsampled, reproduces the low-resolution noisy features. A downsampling module can be constructed with either a fast and simple learned blur kernel implemented by applying convolution independently to each channel, or a more flexible attention-based downsample. As 3D data is rendered into 2D in this NeRF step, the downsampler transforms high-resolution features into low-resolution features at step 410. However, unlike NeRF, the parameters to generate each view is not required to be estimated. Instead, only the parameter to determine the noise of each feature is track and the same transformation is applied to our learned high-resolution features prior to downsampling. The downsampled features are then compared, as step 412 to the true model outputs using a gaussian likelihood loss where the loss term is F sigma f $$L_{rec} = \frac{1}{|T|} \sum_{t \in T} \frac{1}{2s^2 \|f(t(x))\sigma_-(t(F_{hr}))\|_2^2 + \log(s)} \quad (6)$$

F sigma f where T is from a collection of small transforms such as pads, zooms, crops, horizontal flips, and $_{297}$ their compositions. x is the input feature, f is the feature upsampling backbone, $\sigma_{down}$ is the learned downsampler and $\sigma_{up}$ is a learned upsampler. High-res features $F_{hr}$ can be obtained by evaluating $_{hr}=_{up}((x),x)$. A good high-resolution feature map should reconstruct the observed features across all the different views.

Figure 5:
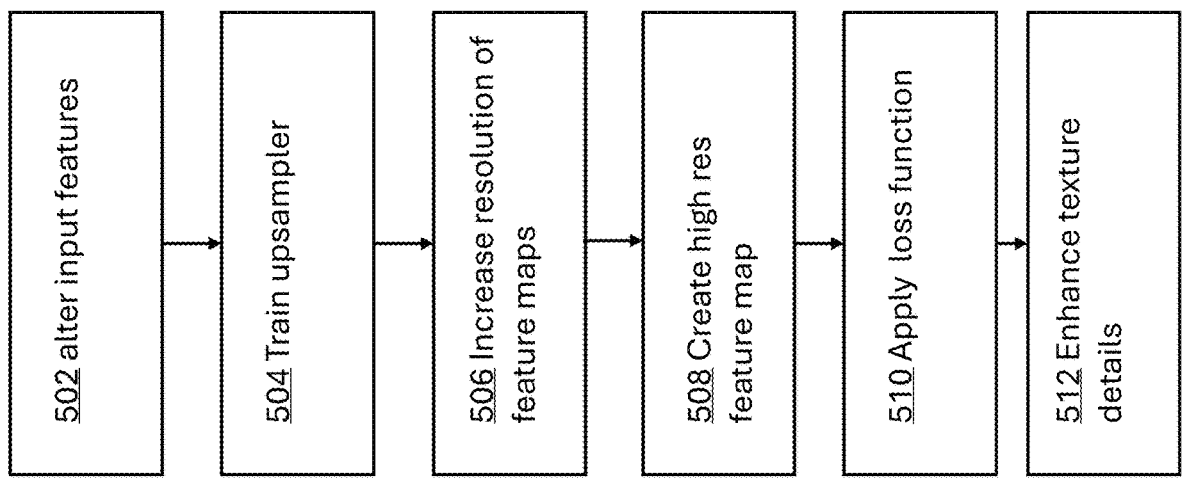
FIG. 5 is a flow chart illustrating the steps a reshaping process in accordance with disclosed implementations.

FIG. 5 illustrates an example of the reshaping process. At step 502, input features are slightly altered with pads, scales, and flips to capture subtle differences. At step 504, the model observes these features from multiple views to train the upsampler. At step 506, the model uses a learned method to increase the resolution of the feature maps. At step 508, a consistent high-resolution feature map is created from the observed views. At step 510, a loss function is applied to compare the upsampled features to the true model outputs, thus guiding the learning process in a conventional manner. At step 512, a super-resolution model is used to enhance the texture details and resolution.

A textured mesh is extracted from the triplane representation where the textured image is refined by differentiable rendering through a UV-space refinement stage via a multi-step MSE loss. First, vertices v is obtained from the neural SDF. The expanded UV map is enhanced by performing a diffusion process in the UV space, achieving lighting-less, inpainting, High Definition (HD) functions to ensure the final texture's completeness and visual appeal.

Figure 6:
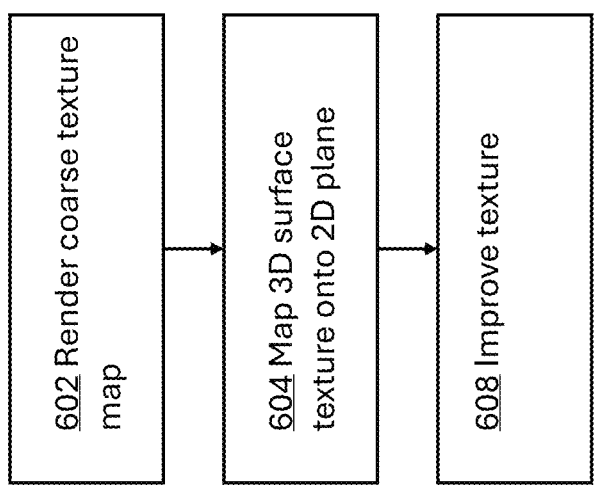
FIG. 6 is a flow chart illustrating the steps a UV-space refinement process in accordance with disclosed implementations.

FIG. 6 illustrates an example of the UV-space refinement process. At step 602 a coarse texture map is rendered from the 3D model's surface using an arbitrary camera view. This rendering creates a basic texture that covers the model but may lack detail and resolution. Then, at step 604, the 3D surface texture is mapped onto a 2D plane using UV coordinates. This mapping defines how the texture image is wrapped around the 3D shape and is essential for maintaining texture consistency across the model. A Dreambooth model can be used to maintain consistency across views. The img2img diffusion process can be guided by the 3D adjacency information, ensuring that the texture refinement respects the 3D structure of the model. Random can be introduced to the texture for refinement and a super-resolution model can be applied to upscale and refine the texture. Finally, the texture is improved through pixel-wise loss optimization as step 608.

A mesh with vertices on the grid lattice and one or more mesh faces within each grid cell can be extracted using, for example Marching Cubes (MC), Marching Tetrahedra (MTet), and other known algorithms. However, many variants of MCs algorithm are not fully differentiable. This effectively prevents the use of continuous Deep Implicit Fields as parameterizations when operating on explicit surface meshes. The non-differentiability of Marching Cubes has been addressed by learning differentiable approximations of it. Such techniques, remain limited to low-resolution meshes or fixed topologies. An alternative approach is to reformulate downstream tasks, such as differentiable rendering or surface reconstruction, directly in terms of implicit functions, so that explicit surface representations are no longer needed. This increases the complexity to optimize the mesh. Therefore, disclosed implementations opt for a differentiable MC (DMC). DMC extracts a triangular mesh corresponding to an iso-surface at a specific level set of the implicit field represented by a neural network. Similar to the traditional MC algorithm, DMC uses a set of cubes to define the triangles on an iso-surface, trained on a weighted loss $L_{dmc}$ defined as:

$$L_{dmc} = w\ L_M + w_{occ}L_{occ} + w_{smooth}L_{smooth} + w_{curve}L_{curve}. \quad (7)$$

where $L_M$ is the point-to-mesh loss, $L_{occ}$ is the occupancy loss, $L_{smooth}$ is the occupancy smoothness loss, and $L_{curve}$ is the curvature loss. Given the objective function defined with respect to surface samples, gradients can be backpropagated all the way back to the latent code z, where a mesh representation that is differentiable end-to-end can be defined while being able to capture changing topologies.

In one example, the model was trained on multi-view renderings of the 3D assets in Objaverse dataset. The assets were handpicked to select usable and semantically meaningful objects. Assets that have realistic textures and complex geometry were tagged as "good", while assets having poor texture, geometry and distortion in the mesh, or an object not recognizable by humans were tagged as "bad". This criterion is subjective and imprecise, but it is good enough for the purpose of data filtering.

The multi-view renderings were generated using Blender under uniform lighting with a resolution of 335 512×512 with a bounding box scale of $[-1,1]^3$. While the output images from the first stage are generated in a structured setup with fixed camera poses, the model was trained using random views as a data augmentation mechanism to increase the robustness. Particularly, 32 views were randomly sampled around each object. A subset of images with 4 orthogonal views were selected as input and another random set of images was selected as supervision for training.

During training, a ray march was conducted through the object bounding box and the triplane features were decoded at each point to a density and color using a shared MLP, to obtain the pixel color via triplane NeRF rendering to synthesize images. For each asset in the training data, orthogonal views are considered for supervision; simple image reconstruction objectives is applied between the V rendered views x^ and the ground-truth views $x^{GT}$, where for every input image x, the loss minimize is as follows:

$$\mathcal{L}_{recon}(x) = \frac{1}{V}\sum_{v=1}^{V}\mathcal{L}_{MSE}(\hat{x}_v, x_v^{GT}) + \lambda\mathcal{L}_{LPIPS}(\hat{x}_v, x_v^{GT}) \quad (8)$$

where $L_{MSE}$ is the normalized pixel-wise L2 loss, $L_{LPIPS}$ is the perceptual image patch similarity and $\lambda$ is a customized weight coefficient.

During inference, 3D mesh is produced from a single input image and additional multi-views images of a 3D asset to guide the reconstruction. 4 images with random camera pose generated with ImageDream as the input of the pre-trained reconstruction model.

The overall design of the disclosed implementations maintains high scalability and efficiency. In addition to the use of a fully transformer-based model, a triplane NeRF is a concise and scalable 3D representation since it is computationally friendly compared to other representations such as volumes and point clouds. Disclosed implementation can be trained by simply minimizing the difference between the rendered images and ground truth images at novel views, without delicate hyper-parameter tuning, allowing the model to be very efficient in training and adaptable to a wide range of multi-view image datasets. Disclosed implementations can reconstruct high-fidelity 3D shapes from a wide range of images captured in the real world, as well as images created by generative models.

The invention claimed is:

1. A method for reconstructing a three-dimensional (3D) scene from a two-dimensional (2D) input image of the scene using a fully-differentiable transformer-based encoder-decoder network, the method comprising:
    encoding the 2D input image into a set of image features using a pre-trained vision transformer model, wherein the vision transformer model is pre-trained with Multiview RGB image supervision and point cloud supervision;
    projecting the set of image features onto a 3D triplane representation using a transformer decoder to obtain output triplane tokens;
    upsampling and reshaping the output triplane tokens into a triplane representation;
    querying the triplane representation to obtain 3D point features;
    predicting, using a multi-layer perceptron, 3D point features of color and density for volumetric rendering;
    representing the geometry of a 3D asset with a surface mesh including vertices and triangular faces by encoding a shape of the 3D asset as a continuous representation of its surface including generating, by a triplane transformer, a neural signed distance function (SDF) and a texture field via two latent codes to encode the shape and texture of the 3D scene, and extracting an iso-surface corresponding to the neural SDF using a differentiable version of the Marching Cubes algorithm, to thereby allow for end-to-end training of the network;
    representing a texture map by with a multichannel image in UV space; and
    synthesizing multiple views of the 3D scene by generating multi-view images simultaneously based on the surface mesh.

2. The method of claim 1, the transformer decoder projects the 2D image features onto the 3D triplane representation by modeling relations among spatially-structured triplane tokens via self-attention.

3. The method of claim 1, wherein the transformer decoder is conditioned on camera and wherein the triplane image tokens include pose-aware image tokens.

4. The method of claim 3, wherein camera features are constructed by flattening out a camera extrinsic matrix and concatenating it with camera focal length and optical center.

5. The method of claim 1, further comprising rendering at least one of the views of the 3D scene.

6. The method of claim 1, wherein the encoding step comprises encoding multiple 2d views of the image and concatenating information from the multiple 2D views with a current view as keys and queries in self-attention layers of the pre-trained vision transformer model.

7. A system for reconstructing a three-dimensional (3D) scene from a two-dimensional (2D) input image of the scene using a fully-differentiable transformer-based encoder-decoder network, the system comprising:
    at least on computer hardware processor;
    at least one memory device storing computer-readable instructions thereon which, when executed by the at least one computer hardware processor, cause the at least one computer hardware processor to carry out a method comprising:
  encoding the 2D input image into a set of image features using a pretrained vision transformer model, wherein the vision transformer model is pre-trained with multi-view RGB image supervision and point cloud supervision;
  projecting the set of image features onto a 3D triplane representation using a transformer decoder to obtain output triplane tokens;
  upsampling and reshaping the output triplane tokens into a triplane representation;
  querying the triplane representation to obtain 3D point features;
  predicting, using a multi-layer perceptron, 3D point features of color and density for volumetric rendering;
  representing the geometry of a 3D asset with a surface mesh including vertices and triangular faces by encoding a shape of the 3D asset as a continuous representation of its surface including generating, by a triplane transformer, a neural signed distance function (SDF) and a texture field via two latent codes to encode the shape and texture of the 3D scene, and extracting an iso-surface corresponding to the neural SDF using a differentiable version of the Marching Cubes algorithm, to thereby allow for end-to-end training of the network;
  representing a texture map by with a multichannel image in UV space; and
  synthesizing multiple views of the 3D scene by generating multi-view images simultaneously based on the surface mesh.

8. The system of claim 7, wherein the transformer decoder projects the 2D image features onto the 3D triplane representation by modeling relations among spatially-structured triplane tokens via self-attention.

9. The system of claim 7, wherein the transformer decoder is conditioned on camera and wherein the triplane image tokens include pose-aware image tokens.

10. The system of claim 9, wherein the camera features are constructed by flattening out a camera extrinsic matrix and concatenating it with camera focal length and optical center.

11. The system of claim 7, the method further comprising rendering at least one of the views of the 3D scene.

12. The system of claim 7, wherein the encoding step comprises encoding multiple 2d views of the image and concatenating information from the multiple 2D views with a current view as keys and queries in self-attention layers of the pre-trained vision transformer model.

13. A method for converting a two-dimensional (2D) image into a three-dimensional (3D) scene using a fully-differentiable transformer-based encoder-decoder network, the method comprising:
  encoding the 2D input image into a set of image features using a pre-trained vision transformer model, which has been pre-trained with multi-view RGB images and point cloud data to enhance its feature extraction capabilities;
  projecting the extracted image features onto a 3D triplane representation by employing a transformer decoder, which processes the features to generate output triplane tokens;
  constructing a triplane representation from the output tokens, which involves upsampling and reshaping the tokens to form a comprehensive 3D structure;
  querying the triplane representation to extract detailed 3D point features, including color and density information essential for volumetric rendering;
  utilizing a multi-layer perceptron to predict the 3D point features, allowing for the generation of a detailed and color-accurate 3D representation;
  representing the geometry of a 3D asset with a surface mesh, which consists of vertices and triangular faces, by encoding a shape of the 3D asset as a continuous representation of its surface including generating, by a triplane transformer, a neural signed distance function (SDF) and a texture field via two latent codes to encode the shape and texture of the 3D scene, and extracting an iso-surface corresponding to the neural SDF using a differentiable version of the Marching Cubes algorithm, to thereby allow for end-to-end training of the network;
  creating a texture map using a multichannel image in UV space, enhancing the visual appearance of the 3D asset by adding surface details and textures; and
  simultaneously generating multiple views of the 3D scene based on the surface mesh, allowing for a comprehensive visualization of the 3D asset from various angles.

* * * * *